(12) United States Patent
Itoafa et al.

(10) Patent No.: US 8,387,946 B2
(45) Date of Patent: Mar. 5, 2013

(54) ELECTROMAGNETIC VALVE

(75) Inventors: Calin Petru Itoafa, Hoechstadt (DE);
Andreas Kufner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 103 days.

(21) Appl. No.: 13/115,280

(22) Filed: May 25, 2011

(65) Prior Publication Data

US 2011/0291035 A1    Dec. 1, 2011

(30) Foreign Application Priority Data

May 25, 2010   (DE) .......................... 10 2010 021 395

(51) Int. Cl.
*F16K 31/02*    (2006.01)

(52) U.S. Cl. ............... 251/129.02; 251/129.15; 251/337

(58) Field of Classification Search ............. 251/129.02, 251/129.15, 337
See application file for complete search history.

(56) References Cited

U.S. PATENT DOCUMENTS

| 7,588,229 | B2 * | 9/2009 | Eiser et al. ............... 251/129.15 |
| 7,857,282 | B2 * | 12/2010 | Goossens ................. 251/129.02 |
| 7,878,480 | B2 * | 2/2011 | Vattaneo et al. .......... 251/129.02 |

FOREIGN PATENT DOCUMENTS

| DE | 10 2005 049 122 A1 | 10/2006 |
| DE | 10 2005 061 509 A1 | 11/2006 |

* cited by examiner

*Primary Examiner* — Eric Keasel
(74) *Attorney, Agent, or Firm* — Lucas & Mercanti, LLP; Klaus P. Stoffel

(57) ABSTRACT

An electromagnetic valve, which has a magnet armature chamber, a pressure medium chamber, a pressure medium inlet channel and a pressure medium outlet channel respectively connected to the pressure medium chamber, a valve seat, and a valve closure member that, upon bearing contact on the valve seat, blocks the connection between the pressure medium inlet channel and the pressure medium outlet channel, and a valve guide extending between the magnet armature chamber and the pressure medium chamber. A sealing ring made of a polymer, which surrounds the valve closure member and separates the magnet armature chamber from the pressure medium chamber, extends between the valve closure member and the valve guide. The geometric design of the sealing ring to the valve guide provides wear resistance for the sealing ring.

4 Claims, 3 Drawing Sheets

ELECTROMAGNETIC VALVE

CROSS-REFERENCE TO RELATED APPLICATION

This application claims the benefit of DE 10 2010 021 395.0 filed May 25, 2010, which is incorporated by reference herein.

FIELD OF THE INVENTION

The invention relates to an electromagnetic valve.

BACKGROUND OF THE INVENTION

In the case of such an electromagnetic valve, the sealing ring serves to minimize unwanted gap leakage flows through the clearance fit between the valve closure member and the valve guide in the direction of the magnet armature chamber and, consequently, of the hydraulic pressure equilibrium of the valve closure member. It is known for electromagnetic valves according to DE 10 2005 049 122 A1 or DE 10 2005 061 509 A1 to be provided with a sealing ring of polytetrafluoroethylene, referred to in short in the following as PTFE, whose contact surface with the valve guide has the surface shape of a spherical segment. As is known, the term spherical segment is to be understood as a geometric body that is produced by removing from a sphere two sphere portions that extend oppositely parallelwise. The intended purpose of this structural design is that the sealing ring, together with the valve guide in the form of a circular truncated cone that is in contact, constitutes a swivel joint in the manner of a spherical joint that affords the valve closure member an angular equalization on the centering valve seat that has as low a resistance as possible, conditional upon component tolerances.

However, practical trials by the applicant have shown that, in the ease of the known designs in respect of the sealing ring to valve guide contact, premature material fatigue of the PTFE sealing ring can occur. The fatigue results in chips on the surface of the material of the sealing ring, which significantly impair its required sealing effect and, consequently, the hydraulic switching function of the electromagnetic valve. The cause of the fatigue is that the actual rotation point of the aforementioned swivel joint is not, as assumed, approximately the central point of the sphere associated with the spherical segment, but is displaced appreciably in the direction of the magnet armature chamber. The result of this is that the valve closure member aligning angularly on the valve seat displaces the sealing ring laterally and presses it, with permanently inadmissibly large forces, against the valve guide.

SUMMARY OF THE INVENTION

The present invention is based on the object of specifying an electromagnetic valve having a wear resistance of the sealing ring that corresponds to the required service life of the valve.

Broadly, the present invention relates to an electromagnetic valve that comprises a magnet armature chamber, a pressure medium chamber having a pressure medium inlet channel and a pressure medium outlet channel respectively connected thereto, a valve seat, a valve closure member that, upon bearing contact on the valve seat, blocks the connection between the pressure medium inlet channel and the pressure medium outlet channel, and a valve guide extending between the magnet armature chamber and the pressure medium chamber for the purpose of carrying the valve closure member in respect of longitudinal movement, and a sealing ring, which surrounds the valve closure member and is supported on the valve guide, and which hydraulically separates the magnet armature chamber from the pressure medium chamber and is composed of a polymer material such as polytetrafluoroethylene (PTFE). In this case, the valve guide contacts the sealing ring by means of an inner circumferential surface substantially having the surface shape of a circular truncated cone that widens toward the pressure medium chamber, and the sealing ring contacts the inner circumferential surface of the valve guide by means of an outer circumferential surface substantially having the surface shape of a spherical segment that widens toward the pressure medium chamber. The object is achieved in the present invention in that the geometric contact point between the inner circumferential surface of the valve guide and the outer circumferential surface of the sealing ring is to be defined by the following relationships: $\beta \leq \alpha_1 + \alpha_2$, wherein $\beta$ is the included angle of the circular truncated cone, and the following is applicable to the angles $\alpha_1$, $\alpha_2$ on the spherical segment: $\cos \alpha_1 = d_1/D$ and $\cos \alpha_2 = d_2/D$, wherein $d_1$ is the greatest diameter of the spherical segment, $d_2$ is the least diameter of the spherical segment, and D is the diameter of the associated sphere.

The term geometric contact point is to be understood as the contact point between the sealing ring and the valve guide that ensues if the elastic material deformation in the contact point is disregarded. As also becomes clear with reference to an exemplary embodiment of the invention to be explained later, it is provided, in other words, that the valve guide supports the sealing ring in an angular range of the spherical segment extending on the pressure medium chamber side, i.e. far outward radially.

The considerably reduced risk of material fatigue of the sealing ring in the case of this design of the sealing ring to valve guide contact can be minimized yet further, in addition, in that the inner circumferential surface of the sealing ring surrounds the valve closure member with a clearance fit. This clearance fit is to be dimensioned, on the one hand, so as to be so small that the hydraulic pressure equalization at the valve closure member is not inadmissibly impaired and, on the other hand, so as to be so great that the radial clearance between the valve closure member and the sealing ring absorbs, at least to a large extent, a tilt component of the valve closure member aligning angularly on the valve seat.

Moreover, material chips on the sealing ring surface can be prevented in that the inner circumferential surface of the sealing ring surrounding the valve closure member is provided with a chamfer or a rounding on the magnet armature chamber side and/or on the pressure medium chamber side. A chamfer or rounding on the magnet armature chamber side results—like the enlarged radial clearance between the valve closure member and the sealing ring—in the sealing ring being relieved of transverse force when the valve closure member aligns with a slight tilt on the valve seat. A chamfer or rounding on the pressure medium chamber side prevents a plastic deformation, in the form of a material chip, on the inner circumferential surface of the sealing ring, which chip is produced by transverse and longitudinal forces of the valve closure member sliding through.

PTFE, having contents of glass fibers, carbon or bronze, is provided as a preferred material for the sealing ring.

BRIEF DESCRIPTION OF THE DRAWINGS

Further features of the invention are disclosed by the following description and by the drawings, wherein the invention is explained more fully. Unless stated otherwise, components or features that are the same or have the same function are denoted by the same reference numerals. In the drawings.

DETAILED DESCRIPTION OF THE DRAWINGS

Figure 1:
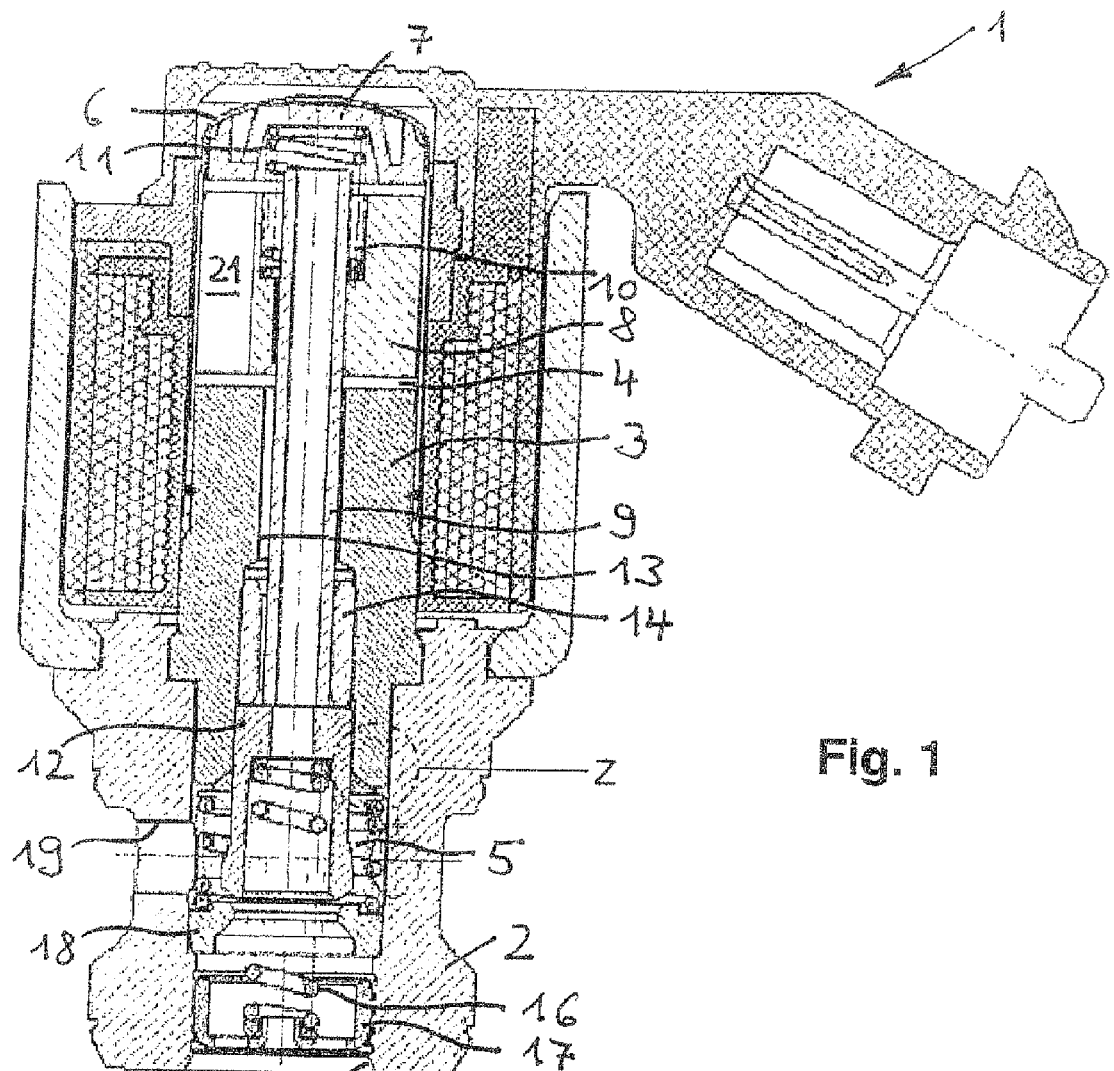
FIG. 1 shows an electromagnetic valve according to the invention, in longitudinal section.

FIG. 1 shows, in longitudinal section, an electromagnetic valve 1 embodied as a 2/2-way seat valve. The electromagnetic valve 1 has a valve housing 2, which is embodied in the style of a cartridge and realized, in respect of production engineering, as a turned part suitable for automated machines. Inserted in the upper portion of the valve housing 2 is a tubular magnet core 3, which is fixed in a liquid-tight manner in the valve housing 2 by means of an outer caulking of the valve housing 2. Placed on the magnet core 3, which delimits, on the one hand, a magnet armature chamber 4 and, on the other hand, a pressure medium chamber 5, is its thin-walled sleeve 6, which is produced by a deep-drawing process and closed in the form of a cup in the end region, and which accommodates a solid end disk 7 in the end region. A magnet armature 8 disposed, beneath the end disk 7, so as to be movable in the sleeve 6 is connected to a tubular valve tappet 9, which is fixed in the magnet armature 8 by means of a press fit. Located between the magnet armature 8 and the end disk 7, in the magnet armature chamber 4, there is a resetting spring 11, which, for the purpose of reliable alignment, is guided portionally in a stepped bore 10 of the magnet armature 8.

Figure 2:
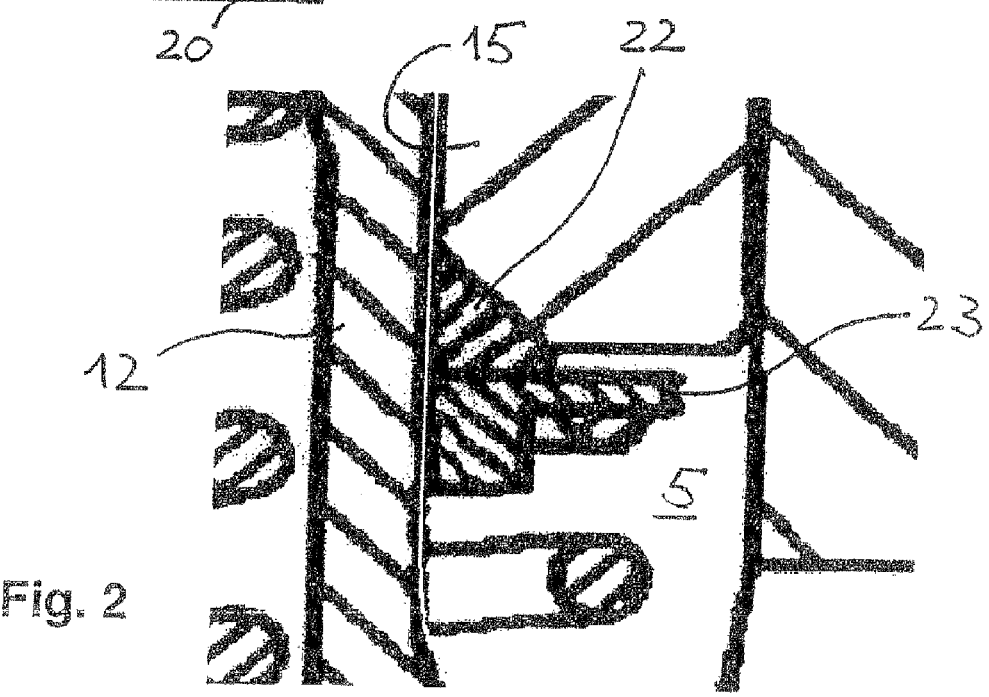
FIG. 2 shows the detail Z according to FIG. 1.

The structural unit consisting of the magnet armature 8 and the valve tappet 9 serves to actuate a likewise tubular valve closure member 12, whose outer circumferential surface, just like the outer circumferential surface of the valve tappet 9, is guided portionally in a central through bore 13 of the magnet core 3. For this purpose, the through bore 13 is embodied as a stepped bore having a lower, widened portion that serves, on the one hand, as a receiver for a bushing 14 pressed into the latter for the purpose of centering and guiding the valve tappet 9 and, on the other hand, constitutes a valve guide 15 (see FIG. 2) that carries the valve closure element 12 in respect of longitudinal movement. The depth to which the bushing 14 is pressed-in in the magnet core 3 is selected such that the desired lift for the valve closure member 12 can be easily set.

In the open, electromagnetically non-energized position, the valve closure member 12, under the action of a valve spring 16, rests on the end face of the bushing 14. The valve spring 16 is biased by means of a spring stop 17 pressed into the opening of the valve housing 2 from below and, accordingly, it can also be set. The tube shape of the valve closure member 12, offset in the inner diameter, enables individual coils of the valve spring 16 to be accommodated and supported in a reliable, compact manner without impeding the pressure equalization at the valve closure element 12. The coil end that faces away from the valve closure member 12 is likewise centered by means of a nose piece at the cap-shaped spring stop 17, which is produced through deep-drawing of thin sheet metal.

Above the spring stop 17, a valve seat 18 in the form of a taper sealing seat, which acts together with the valve closure member 12, is pressed into the valve housing 2. According to FIG. 2, the valve closure member 12 is carried with radial clearance in respect of the cylindrical portion of the valve guide 15 and, in the closed valve switching position, can align itself fully on the valve seat 18. Angular errors between the valve seat 18 and an associated sealing surface of the valve closure member 12 that are due to component tolerances can thus be compensated in favor of an optimal sealing effect. At the level of the valve closure member 12, and therefore above the valve seat 18, the valve housing 2 has a pressure medium inlet channel 19, which, in the open valve switching position represented, is connected, via the pressure medium chamber 5, to a pressure medium outlet channel 20 that opens vertically into the valve housing 2 from below.

For the purpose of reducing the hydraulic resistance, pressure equalizing bores 21 go through the magnet armature 8, parallelwise in relation to the longitudinal axis thereof. The pressure medium flowing through the pressure medium chamber 5 can thus pass unhindered, through the valve closure member 12, the valve tappet 9 and the magnet armature 8, into the upper magnet armature chamber 4, and thereby to the end region of the sleeve 6, such that, advantageously, an almost constant switching characteristic of the electromagnetic valve 1 is ensured, irrespective of differences in pressure and temperature of the pressure medium.

In this regard, the hydraulic pressure equalization of the electromagnetic valve 1 is of particular importance. As becomes clear through the inclusion of FIG. 2, for this purpose there extends, between the valve guide 15 and the valve closure member 12, a sealing ring 22 that surrounds the valve closure member 12 with a clearance fit in the manner of a leakage gap and thereby, in the closed valve switching position, hydraulically separates the magnet armature chamber 4 from the pressure medium chamber 5. The sealing ring 22, which is composed of PTFE having a 10% carbon content in the form of small graphite balls, is held in sealing contact with the valve guide 15 by a spring-loaded spring collar 23.

Figure 3:
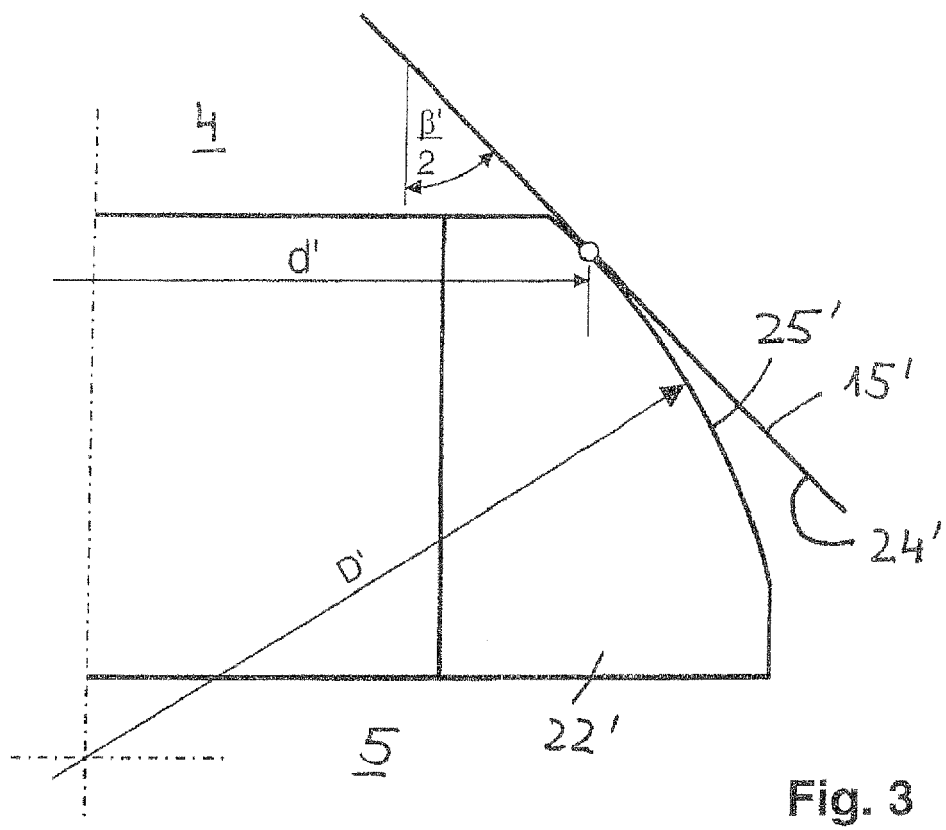
FIG. 3 shows a geometric sketch of a known sealing ring to valve guide contact.

The structural design of this sealing contact according to the invention is explained in the following with reference to FIGS. 3 to 5; the starting point is to be FIG. 3, with a known sealing contact. The valve guide 15' and the sealing ring 22' contact each other by means of, on the valve guide side, an inner circumferential surface 24' having substantially the surface shape of a circular truncated cone that widens toward the pressure medium chamber 5, and by means of, on the sealing ring side, an outer circumferential surface 25' having substantially the surface shape of a spherical segment that widens toward the pressure medium chamber 5. The included angle of the circular truncated cone is $\beta'$, while the sphere corresponding to the spherical segment has the diameter $D'$. The contact point, represented in the form of a point, that ensues geometrically, i.e. if elastic deformations of the contact surfaces 24' and 25' are disregarded, is located, in the case of the known taper angle $\beta'$, on a small circle of the spherical segment whose diameter $d'$ is comparatively small relative to the design of the sealing contact according to the invention, according to FIG. 4. The considerably larger small-circle diameter $d$ therein results from the fact that the inner circumferential surface 24 of the valve guide 15 has an included angle $\beta$ of the circular truncated cone that is appreciably smaller in comparison with $\beta'$.

The thereby improved wear resistance of the sealing ring 22 subjected to dynamic transverse forces is additionally increased in that, on the one hand, the cylindrical inner circumferential surface 26 of the sealing ring 22 now surrounds the valve closure member 12 (not represented in FIGS. 3 to 5) with a clearance fit. This is illustrated in FIG. 4 by the crosssectional contour of the known sealing ring 22', having an appreciably smaller inner diameter 26', represented by the dotted line, as a comparison. On the other hand, the inner circumferential surface 26 of the sealing ring 22 is provided, on the magnet armature chamber 4 side and on the pressure medium chamber 5 side, with a chamfer 27 and 28, respectively. As explained at the outset, the chamfers 27, 28 serve to improve the wear stability and dimensional stability of the sealing ring 22 in respect of transverse forces of the valve closure member 12.

Figure 4:
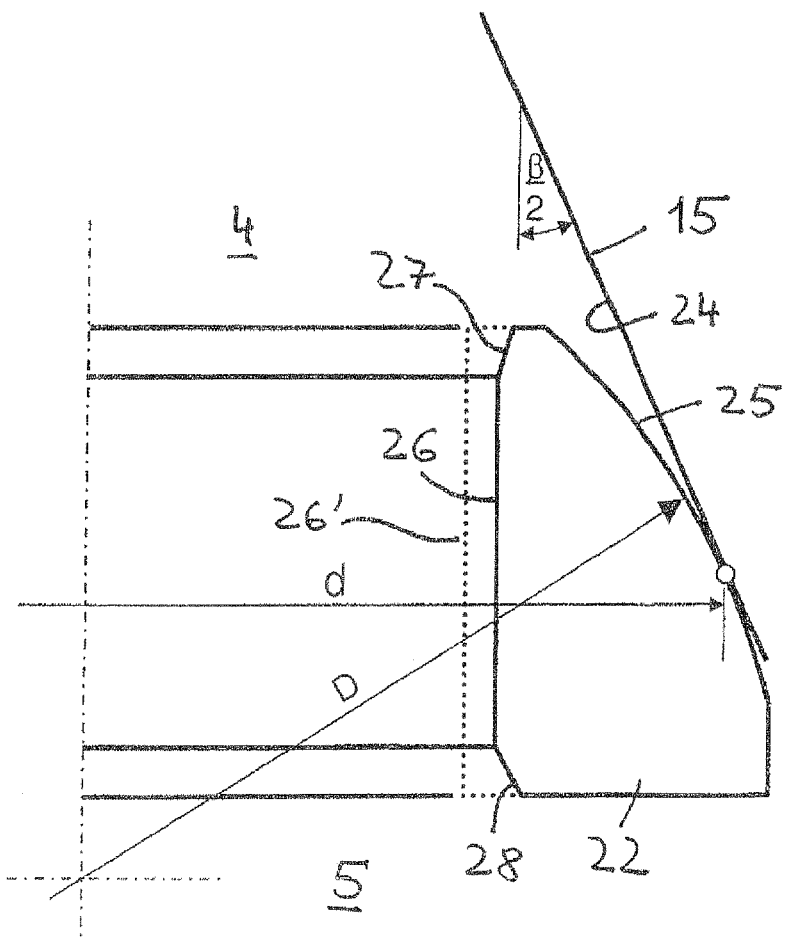
FIG. 4 shows a geometric sketch of a sealing ring to valve guide contact according to the invention.
Figure 5:
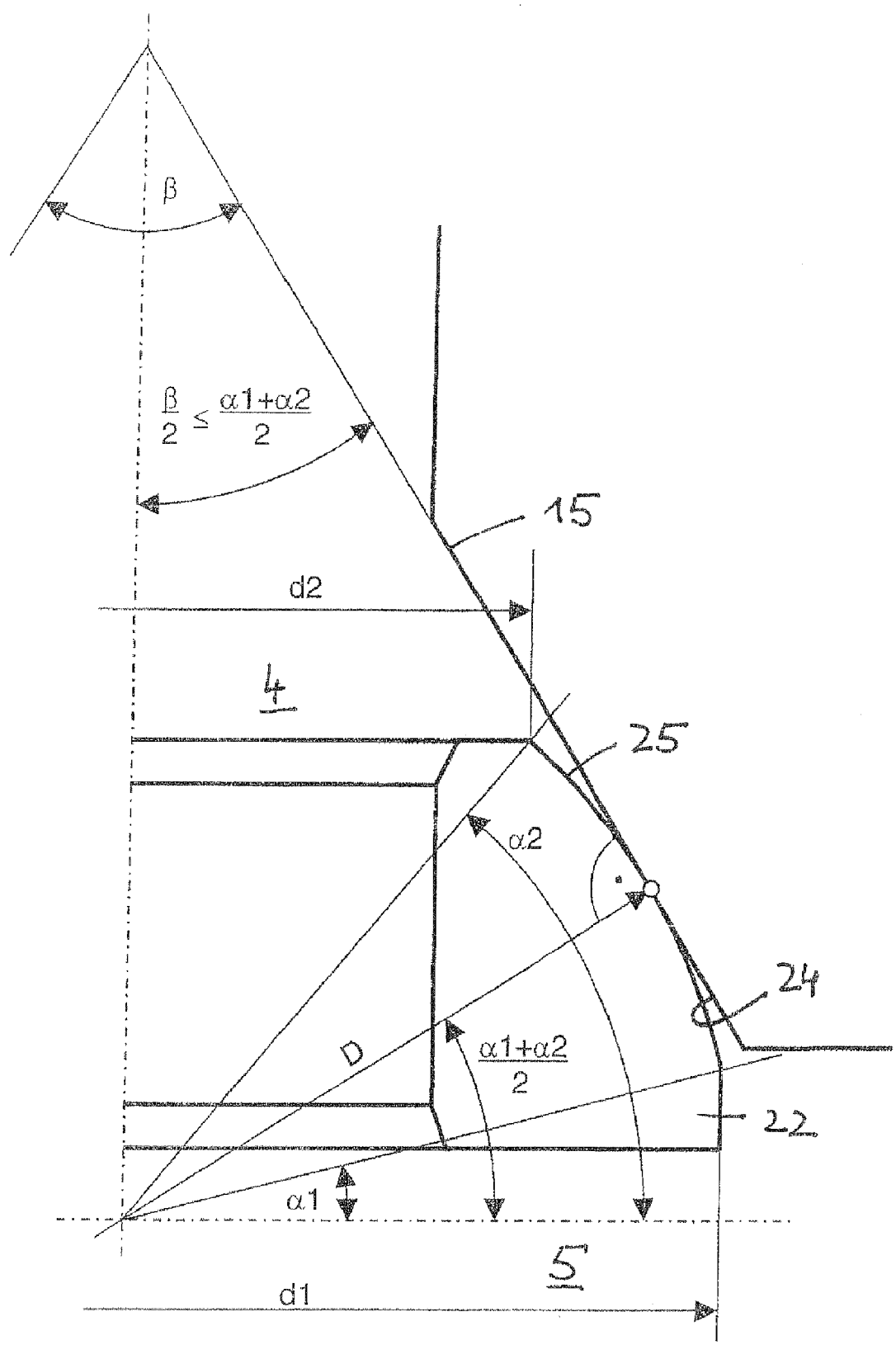
FIG. 5 shows a geometric sketch according to FIG. 4, in greater detail.

As represented in FIG. 5, as further detailing of FIG. 4, according to the invention the geometric contact point between the inner circumferential surface 24 of the valve guide 15 and the outer circumferential surface 25 of the sealing ring 22 is defined by the following geometric relationships:

$$\beta \leq \alpha_1 + \alpha_2,$$

wherein the following is applicable to the angles $\alpha_1$, $\alpha_2$ on the spherical segment:

$$\cos \alpha_1 = d_1/D \text{ and } \cos \alpha_2 = d_2/D.$$

In this case, $d_1$ is the greatest diameter of the spherical segment extending on the pressure medium chamber 5 side, $d_2$ is the least diameter of the spherical segment extending on the magnet armature chamber 4 side, and D is the diameter of the associated sphere.

In the case of this structural design of the sealing contact, the valve guide 15 supports the sealing ring 22 in an angular range of the spherical segment extending close to the pressure medium chamber 5, i.e. far outward radially. On the basis of the representation, an angular range for the contact point that is favorable in respect of wear is then located (with decreasing $\beta$) between $\alpha_1$ and the angle bisector between $\alpha_1$ and $\alpha_2$, i.e. $0.5 (\alpha_1 + \alpha_2)$.

LIST OF REFERENCE NUMERALS

1 Electromagnetic Valve
2 Valve Housing
3 Magnet Core
4 Magnet Armature Chamber
5 Pressure Medium Chamber
6 Sleeve
7 End Disk
8 Magnet Armature
9 Valve Tappet
10 Stepped Bore of the Magnet Armature
11 Resetting Spring
12 Valve Closure Member
13 Through Bore of the Magnet Core
14 Bushing
15 Valve Guide
16 Valve Spring
17 Spring Stop
18 Valve Seat
19 Pressure Medium Inlet Channel
20 Pressure Medium Outlet Channel
21 Pressure Equalization Bore
22 Sealing Ring
23 Spring Collar
24 Sealing Contact Surface of the Valve Guide
25 Sealing Contact Surface of the Sealing Ring
26 Inner Diameter of the sealing Ring
27 Chamfer
28 Chamfer

The invention claimed is:

1. An electromagnetic valve, comprising:
   a valve housing having a bore;
   a magnet armature chamber formed in the bore of the housing;
   a pressure medium chamber formed in the bore of the housing and spaced from the magnet armature chamber;
   a magnetic core having a central bore fixed in the bore of the housing and delimited on a first end by the magnet armature chamber and delimited on a second end by the pressure medium chamber;
   a pressure medium outlet channel formed by the bore in the housing;
   a pressure medium inlet channel formed in a sidewall of the housing and connectable via the pressure medium chamber to the pressure medium outlet channel;
   a valve seat arranged in the bore of the housing in a region near the base of the housing;
   a valve closure member guided in the central bore of the magnetic core that, upon bearing contact on the valve seat, blocks a connection between the pressure medium inlet channel and the pressure medium outlet channel;
   a valve guide, which has an inner circumferential surface substantially having the surface shape of a circular truncated cone that widens toward the pressure medium chamber, extending between the magnet armature chamber and the pressure medium chamber for carrying the valve closure member in respect of longitudinal movement; and
   a sealing ring, which has an outer circumferential surface substantially having the surface shape of a spherical segment that widens toward the pressure medium chamber, surrounding the valve closure member, supporting on the valve guide and hydraulically separating the magnet armature chamber from the pressure medium chamber, and the sealing ring being composed of a polymer material,
   the valve guide contacting the sealing ring by means of the inner circumferential surface, and the sealing ring contacting the inner circumferential surface of the valve guide by means of the outer circumferential surface,
   wherein a geometric contact point between the inner circumferential surface of the valve guide and the outer circumferential surface of the sealing ring is defined by the following relationships:

$$\beta \leq \alpha_1 + \alpha_2,$$

wherein $\beta$ is an included angle of the circular truncated cone, and the following is applicable to angles $\alpha_1$, $\alpha_2$ on a spherical segment:

$$\cos \alpha_1 = d_1/D \text{ and } \cos \alpha_2 = d_2/D,$$

wherein $d_1$ is a greatest diameter of the spherical segment, $d_2$ is a smallest diameter of the spherical segment, and D is a diameter of an associated sphere.

2. The electromagnetic valve according to claim 1, wherein the inner circumferential surface of the sealing ring surrounds the valve closure member with a clearance fit.

3. The electromagnetic valve according to claim 1, wherein the inner circumferential surface of the sealing ring surrounding the valve closure member has a chamfer or a rounding on a magnet armature chamber side and/or on a pressure medium chamber side.

4. The electromagnetic valve according to claim 1, wherein the sealing ring is composed of polytetrafluoroethylene (PTFE) and contents of glass fibers, carbon or bronze.

* * * * *